(12) United States Patent
Park et al.

(10) Patent No.: US 11,273,731 B2
(45) Date of Patent: Mar. 15, 2022

(54) SEAT APPARATUS FOR VEHICLE

(71) Applicants: Hyundai Motor Company, Seoul (KR); Kia Motors Corporation, Seoul (KR); Daechang Seat Co., LTD-Dongtan, Hwaseong-si (KR)

(72) Inventors: Hyung Jin Park, Anyang-Si (KR); Guk Mu Park, Seoul (KR); Byeong Kwang Kim, Gumi-Si (KR); Sang Uk Yu, Seoul (KR); So Young Yoo, Suwon-Si (KR); Seon Chae Na, Yongin-Si (KR); Byung Yong Choi, Hwaseong-Si (KR); Myung Soo Lee, Ulsan (KR); Chan Ki Cho, Gwangju (KR); Gyeong Jae Lee, Hwaseong-Si (KR)

(73) Assignees: Hyundai Motor Company, Seoul (KR); Kia Motors Corporation, Seoul (KR); Daechang Seat Co., LTD-Dongtan, Hwaseong-si (KR)

( * ) Notice: Subject to any disclaimer, the term of this patent is extended or adjusted under 35 U.S.C. 154(b) by 84 days.

(21) Appl. No.: 16/831,597

(22) Filed: Mar. 26, 2020

(65) Prior Publication Data

US 2021/0129712 A1 May 6, 2021

(30) Foreign Application Priority Data

Oct. 31, 2019 (KR) .................. 10-2019-0137112

(51) Int. Cl.
*B60N 2/16* (2006.01)
*B60N 2/005* (2006.01)
(Continued)

(52) U.S. Cl.
CPC ............. *B60N 2/164* (2013.01); *B60N 2/005* (2013.01); *B60N 2/0232* (2013.01); *B60N 2/06* (2013.01);
(Continued)

(58) Field of Classification Search
CPC .......... B60N 2/163; B60N 2/164; B60N 2/16; B60N 2/0232; B60N 2002/0236;
(Continued)

(56) References Cited

U.S. PATENT DOCUMENTS 3,437,373 A * 4/1969 Boston ..................... B60N 2/06
296/65.07
3,841,696 A * 10/1974 Wagner .................. B60N 2/067
296/65.13
(Continued)

FOREIGN PATENT DOCUMENTS

GB 191121666 A * 10/1912 ........... B60N 2/1853
KR 10-2013-0047017 A 5/2013
KR 10-2018-0091347 A 8/2018

*Primary Examiner* — Milton Nelson, Jr.
(74) *Attorney, Agent, or Firm* — Morgan, Lewis & Bockius LLP

(57) ABSTRACT

A seat apparatus for a vehicle is provided, wherein a base bracket and a moving bracket are mounted to a body floor to lift and lower a seat, and a seat track is mounted to the moving bracket to move the seat in forward and rearward directions, so that the seat is moved and lifted and lowered. Accordingly, since the lifting/lowering structure of the seat is mounted to the body floor, space is secured below the seat, so indoor atmosphere is improved due to the increase of the space efficiency.

15 Claims, 6 Drawing Sheets

(51) Int. Cl.
 *B60N 2/06* (2006.01)
 *F16H 25/20* (2006.01)
 *B60N 2/02* (2006.01)

(52) U.S. Cl.
 CPC ...... *F16H 25/20* (2013.01); *B60N 2002/0236* (2013.01)

(58) Field of Classification Search
 CPC .......... B60N 2/005; B60N 2/06; B60N 2/067; B60N 2/185; F16H 25/20
 USPC .................................................... 297/344.14
 See application file for complete search history.

(56) References Cited

U.S. PATENT DOCUMENTS

| | | | | |
|---|---|---|---|---|
| 4,241,893 A | * | 12/1980 | Koutsky | B60N 2/06 248/425 |
| 4,944,555 A | * | 7/1990 | Brusasco | B60N 2/0232 297/330 |
| 2007/0205626 A1 | | 9/2007 | Ohtsubo et al. | |

\* cited by examiner

SEAT APPARATUS FOR VEHICLE

CROSS REFERENCE TO RELATED APPLICATION

The present application claims priority to Korean Patent Application No. 10-2019-0137112, filed Oct. 31, 2019, the entire contents of which is incorporated herein for all purposes by this reference.

BACKGROUND OF THE INVENTION

Field of the Invention

The present invention generally relates to a seat apparatus for a vehicle, by which a seat is lifted and lowered, and moved. More particularly, the present invention relates to a seat apparatus for a vehicle, whereby a mounting space on a body floor is reduced when the moving structure of a seat is applied.

Description of Related Art

The seat of a vehicle allows a driver or passenger to sit in a comfortable posture so as not to feel tired even when traveling long distances. Such a seat supports weight of a passenger and is largely configured to include a seat cushion mounted to an indoor floor surface to slide forward and rearward, and a seatback mounted to rotate at a predetermined angle to the seat cushion to support a passenger's back.

Meanwhile, in the boarding space of the vehicle, people of various body sizes may be boarded, and various spaces may be required for loading goods. To satisfy these requirements, a seatback may be folded and its angle may be freely adjusted.

However, conventionally, to implement the movement function of a seat, a pair of rails are provided below the seat, so dead space is increased. That is, a fixed rail for the forward/rearward movements of a seat is provided on a body floor, and a moving rail moving on the fixed rail is provided. Since the fixed rail and the moving rail are configured to be paired to each other in a lower side of the seat, there is a problem in that the mounting area is increased and the number of parts is also increased.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a seat apparatus of a vehicle, whereby the mounting space of the moving and lifting/lowering structure of a seat is reduced to increase the space efficiency of a body floor.

In various aspects of the present invention, there is provided a seat apparatus of a vehicle, the apparatus including: a base bracket configured to be fixed to a body floor; a moving bracket coupled to the base bracket to lift and lower in upward and downward directions via a guide portion extending in the upward and downward directions from the base bracket; a drive mechanism mounted to the base bracket and connected to the moving bracket, the drive mechanism providing power so that the moving bracket moves along the guide portion; and a seat track mounted to the moving bracket and configured for lifting and lowering with the moving bracket, the seat track allowing a seat frame to move in forward and rearward directions.

The guide portion may be mounted to the base bracket by diagonally extending in the forward or rearward direction therefrom or vertically extending therefrom.

The guide portion may include a guide rail extending in the upward and downward directions and a sliding portion coupled to the guide rail to slide thereon, the base bracket may include a pair of base panels, with the sliding portion being provided on an internal surface of each of the base panels, and the moving bracket may be located between the pair of base panels and has the guide rail provided at each of opposite sides thereof, the guide rail being connected to the sliding portion of each of the base panels.

A support rod may be provided in the base bracket, the support rod being combined with each of the base panels by extending in an opposite direction thereof.

The moving bracket may be configured as a pair of moving panels, with the guide rail being provided on a surface of each of the moving panels opposite to the base panel.

A connecting rod may be provided in the moving bracket, the connecting rod being combined with each of the moving panels by extending in an opposite direction thereof.

The base bracket may be configured as a shape of a polygon by a fixing portion fixed to the body floor and a plurality of extension portions extending upwards from the fixing portion, and the moving bracket may be configured as a shape of a polygon by a mount portion to which the seat track is mounted and a plurality of connection portions extending downwardly from the mount portion.

Any one extension portion of the base bracket and any one connection portion of the moving bracket may be collinear with each other, and the guide portion may be provided in the extension portion which is collinear with the connection portion.

The drive mechanism may include: a motor portion mounted to the base bracket; and a conveying portion extending in an extending direction of the guide portion from the motor portion and connected to the moving bracket, the conveying portion allowing the moving bracket to move along the guide portion during operation of the motor portion.

The motor portion may be configured to provide a rotational force, the conveying portion may be configured as a lead screw extending along an extending direction of the guide rail, and a moving portion may be provided in the moving bracket, the moving portion being screwed to the lead screw and moving along the conveying portion rotated during the operation of the motor portion.

The apparatus may further include: an auxiliary drive portion rotatably connected to the body floor at a first end portion thereof and rotatably connected to the moving bracket at a second end portion thereof, the auxiliary drive portion being variable in length to assist the lifting and lowering of the moving bracket.

The auxiliary drive portion may be configured to be variable in length in the extending direction of the guide portion and to provide a repulsive force to the moving bracket in a lifting direction thereof.

The seat track may include: a fixed rail fixed to an upper end portion of the moving bracket and extending in the forward and rearward directions; a moving rail connected to the fixed rail to slide in the forward and rearward directions thereon and to which the seat frame is mounted; and a drive motor mounted to the moving rail and moving the moving rail in the forward and rearward directions.

According to the seat apparatus of a vehicle having the structure described above, the base bracket and the moving bracket are mounted to the body floor to lift and lower a seat, and the seat track is mounted to the moving bracket to move the seat in forward and rearward directions, so that the seat is moved and lifted and lowered. Accordingly, since the lifting/lowering structure of the seat is mounted to the body floor, space is secured below the seat, so indoor atmosphere is improved due to the increase of the space efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
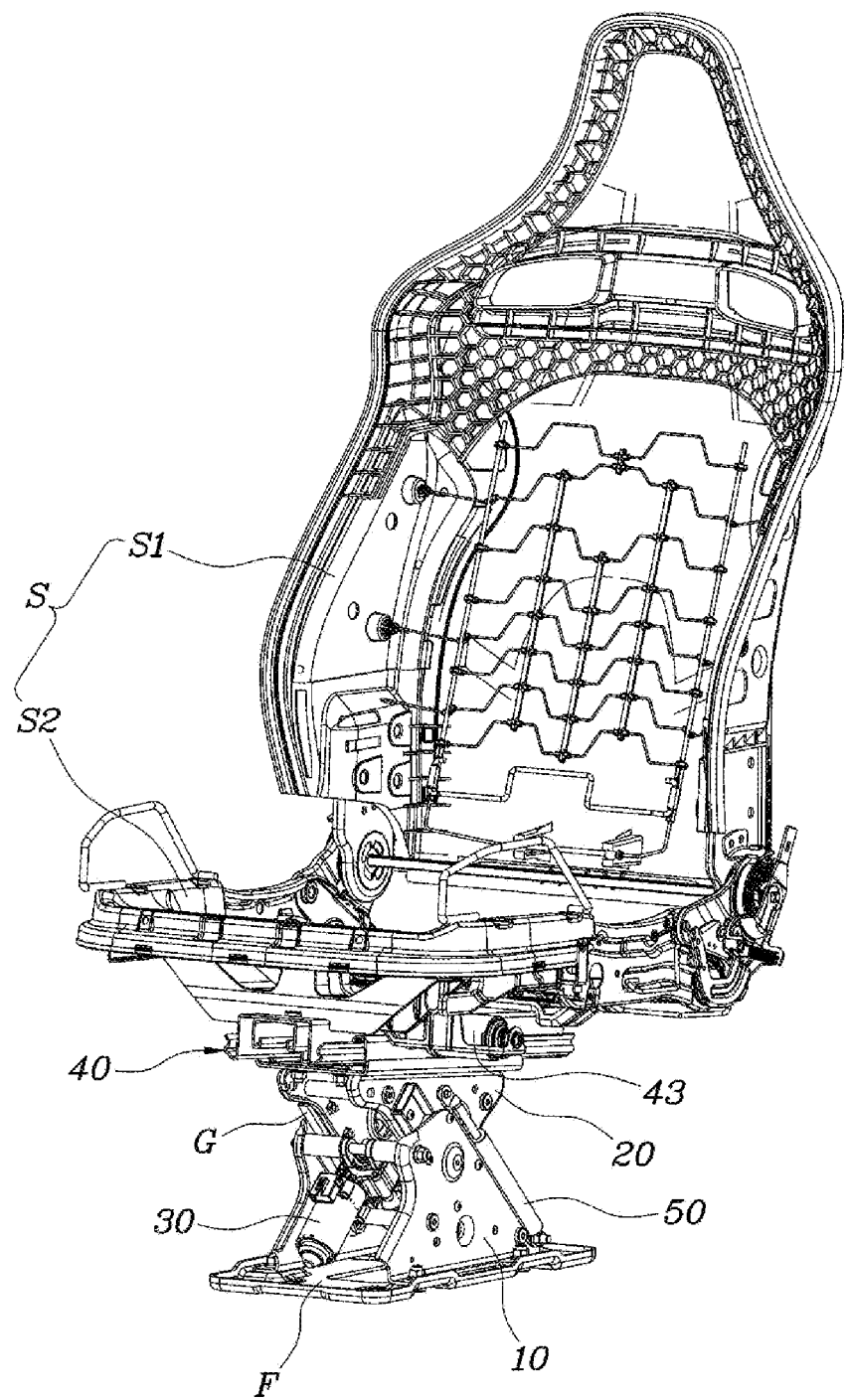
FIG. 1 is a perspective view exemplarily illustrating a seat apparatus of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, a seat apparatus of a vehicle according to an exemplary embodiment of the present invention will be described in detail with reference to the accompanying drawings.

Figure 2:
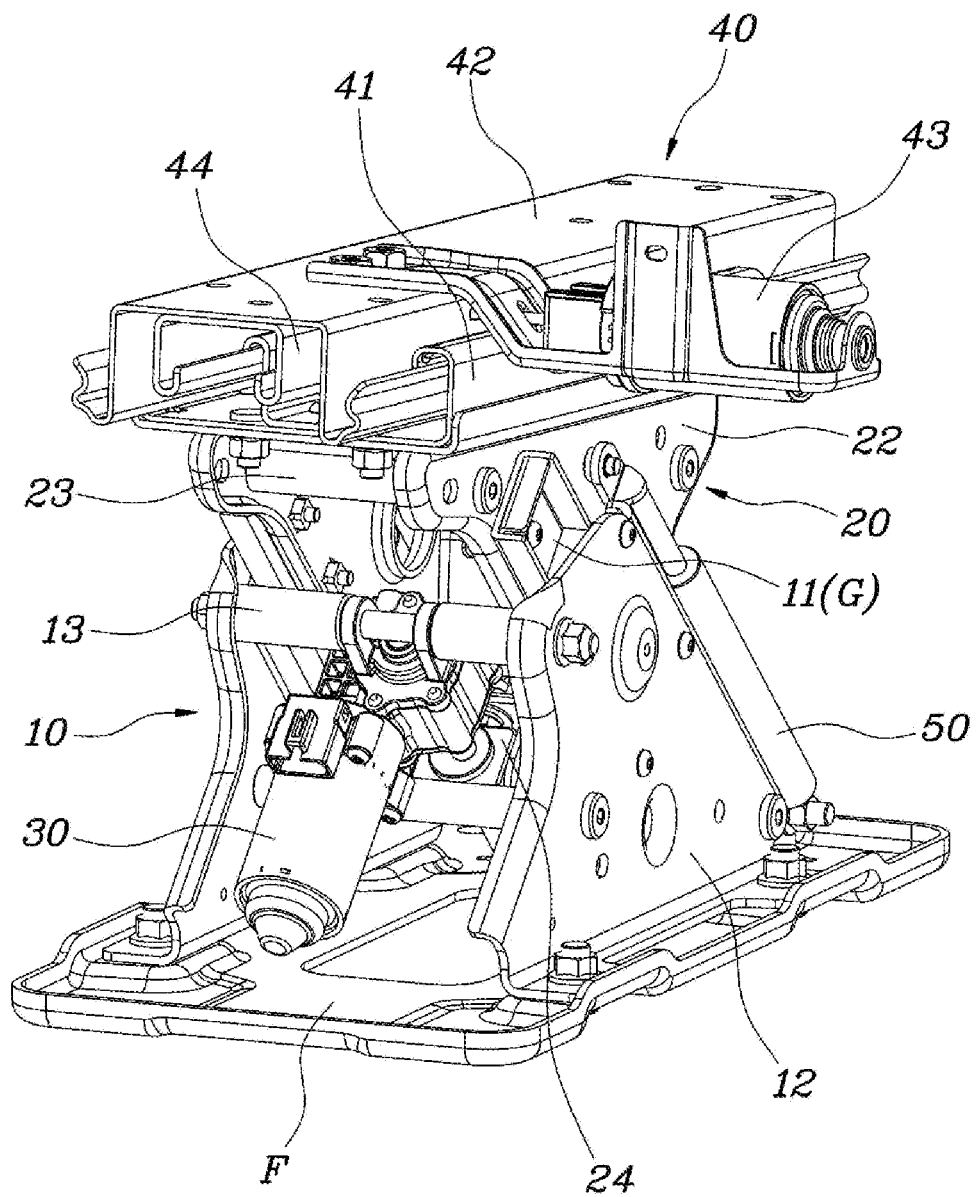
FIG. 2 and FIG. 3 are views illustrating the structure of the seat apparatus of a vehicle illustrated in FIG. 1.
Figure 3:
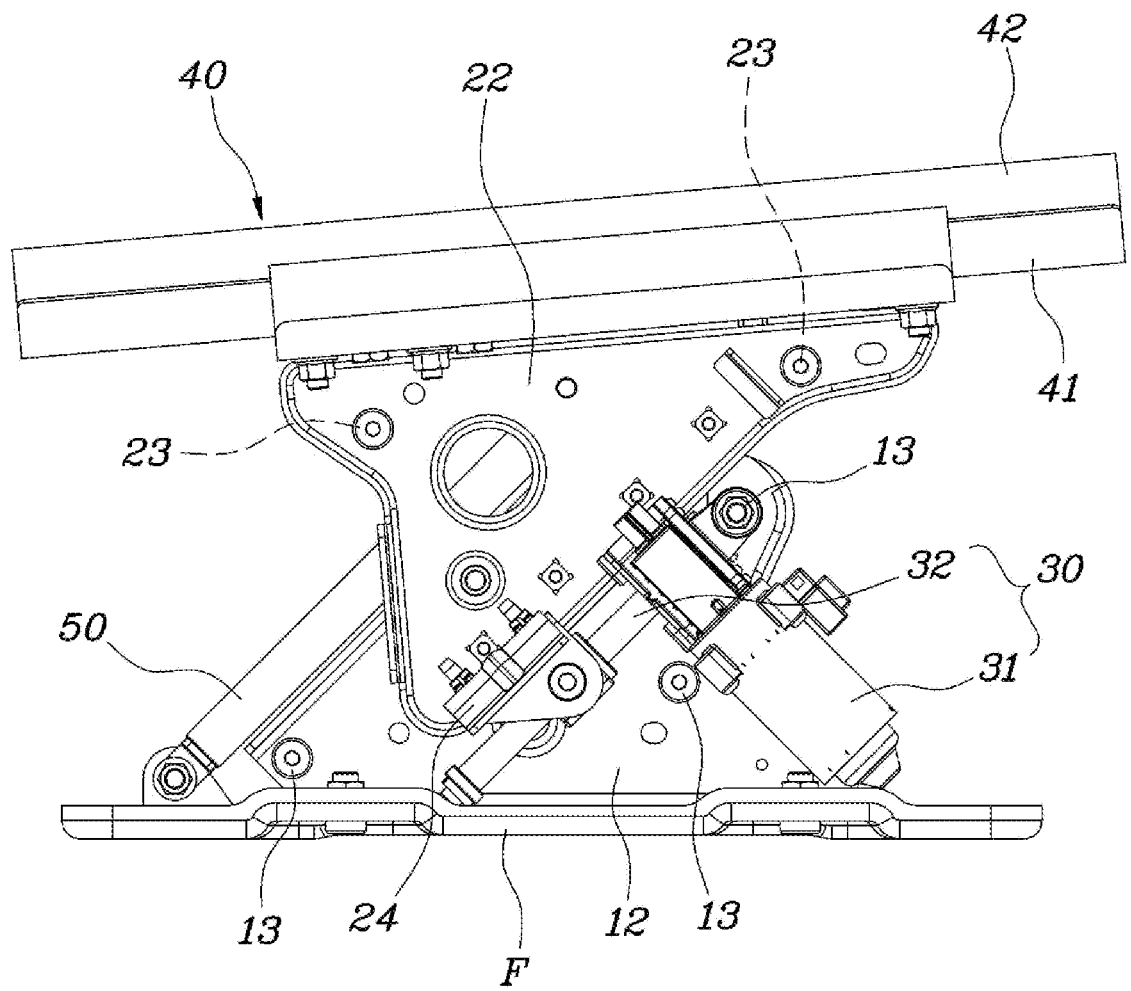
Figure 4:
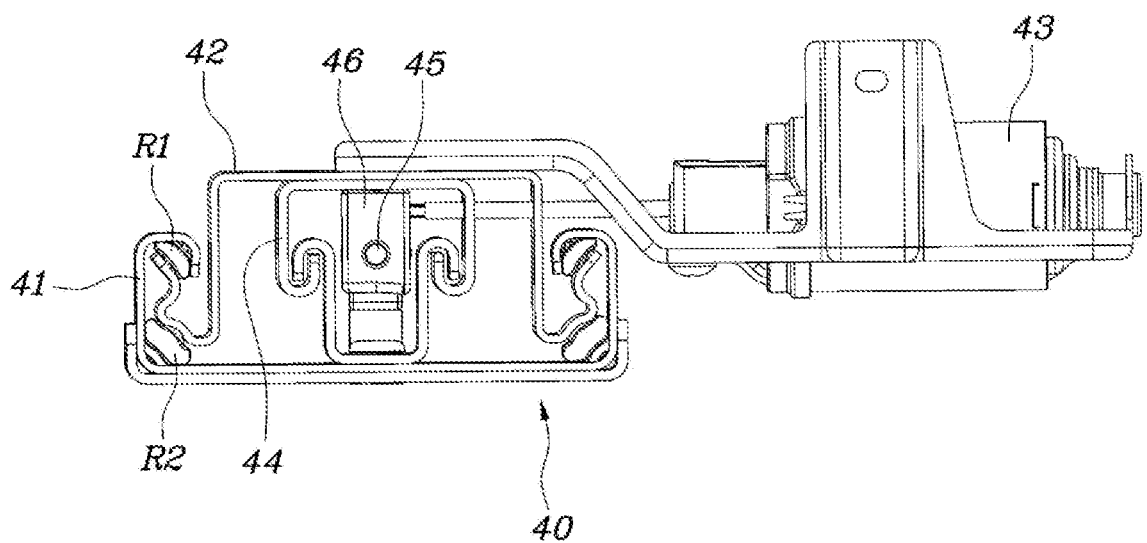
FIG. 4 is a view exemplarily illustrating a seat track of the seat apparatus of a vehicle illustrated in FIG. 1.
Figure 5:
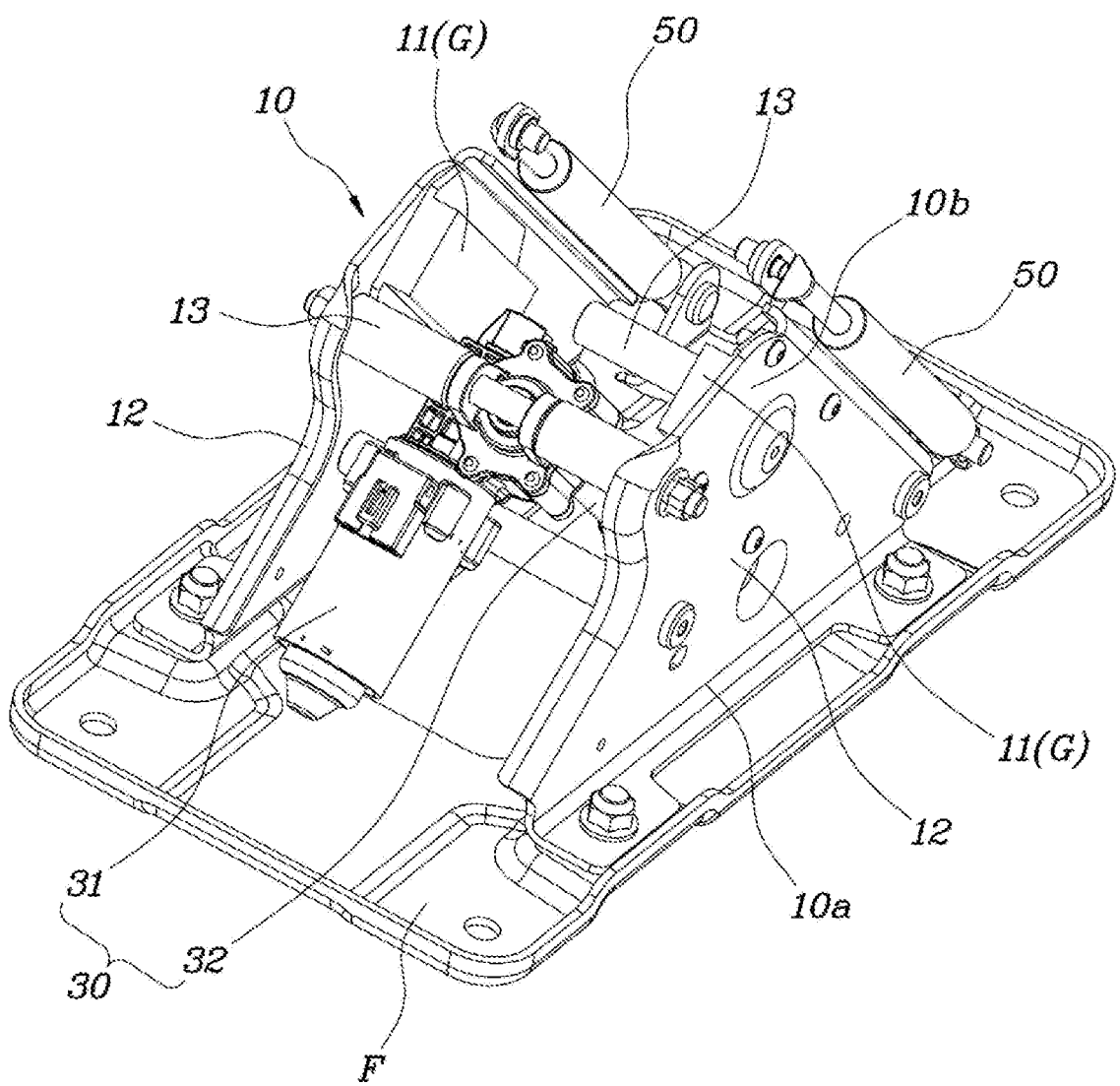
FIG. 5 is a view exemplarily illustrating a base bracket and a drive mechanism of the seat apparatus of a vehicle illustrated in FIG. 1.
Figure 6:
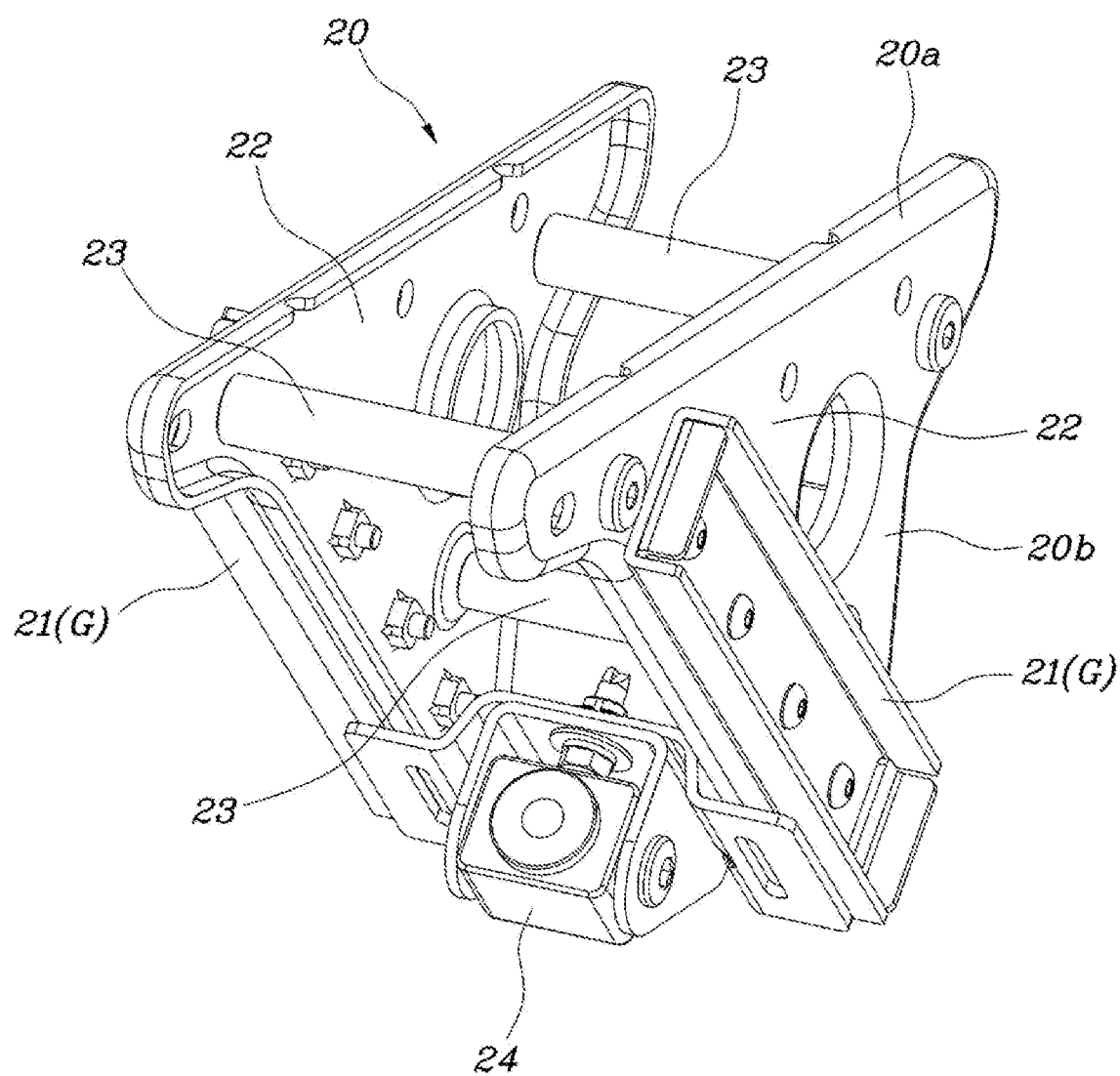
FIG. 6 is a view exemplarily illustrating a moving bracket of the seat apparatus of a vehicle illustrated in FIG. 1.

FIG. 1 is a perspective view exemplarily illustrating a seat apparatus of a vehicle according to an exemplary embodiment of the present invention; FIG. 2 and FIG. 3 are views illustrating the structure of the seat apparatus of a vehicle illustrated in FIG. 1; FIG. 4 is a view exemplarily illustrating a seat track of the seat apparatus of a vehicle illustrated in FIG. 1; FIG. 5 is a view exemplarily illustrating a base bracket and a drive mechanism of the seat apparatus of a vehicle illustrated in FIG. 1; and FIG. 6 is a view exemplarily illustrating a moving bracket of the seat apparatus of a vehicle illustrated in FIG. 1.

As illustrated in FIG. 1 and FIG. 2, the seat apparatus of a vehicle according to an exemplary embodiment of the present invention may include the base bracket 10 fixed to a body floor F; the moving bracket 20 mounted to lift and lower in upward and downward directions via a guide portion G extending in the upward and downward directions from the base bracket 10; the drive mechanism 30 mounted to the base bracket 10 and connected to the moving bracket 20, the drive mechanism providing power such that the moving bracket 20 moves along the guide portion G; and the seat track 40 mounted to the moving bracket 20 and lifting and lowering together with the moving bracket 20, the seat track allowing a seat frame S to move in forward and rearward directions.

According to the seat apparatus of the present invention, the base bracket 10 fixed to the body floor F has a predetermined height in the upward and downward directions, and the guide portion G extending in the upward and downward directions is mounted to the base bracket 10. Here, the guide portion may diagonally extend in the forward or rearward direction thereof, or vertically extend in the upward and downward directions thereof. The extension angle and extension length of the guide portion G are determined according to the initial design of the seat apparatus, in which indoor space and a seat are considered. The lifting and lowering directions and height of the seat frame S are determined by the extension angle and extension length of the guide portion G.

The moving bracket 20 is mounted to the guide portion G to move along the extension direction of the guide portion, and the moving bracket 20 may be lifted and lowered along the guide portion G by the drive mechanism 30 mounted to the base bracket 10.

Meanwhile, the seat track 40 is mounted to the moving bracket 20, and the seat frame S is mounted to the seat track 40 to move in the forward and rearward directions. Here, the seat frame S is configured to include a seat back frame S1 and a cushion frame S2 connected to each other by a recliner, wherein the cushion frame S2 may be mounted to the seat track 40.

As illustrated in FIGS. 2 and 4, the seat track 40 may include: a fixed rail 41 fixed to an upper end portion of the moving bracket 20 and extending in the forward and rearward directions; a moving rail 42 coupled to the fixed rail 41 to slide in the forward and rearward directions and to which the seat frame S is mounted; and a drive motor 43 mounted to the moving rail 42 and moving the moving rail 42 in the forward and rearward directions.

That is, the fixed rail 41 is fixed to an upper end portion of the moving bracket 20 and provides a moving path of the moving bracket 20 in the forward and rearward directions, and the seat frame S is mounted to the moving rail 42 and is slidably connected to the fixed rail 41. Here, a roller R1 and a bearing ball R2 are provided between the fixed rail 41 and the moving rail 42 such that the moving rail 42 slides efficiently, and a reinforcement rail 44 may be provided in each of the fixed rail 41 and the moving rail 42 to reinforce rigidity.

The drive motor 43 for moving the moving rail 42 is mounted to the moving rail 42 and moves together with the moving rail 42 along a guide rod 45, so that the seat frame S mounted to the moving rail 42 may move in the forward and rearward directions. Here, the guide rod 45 may be configured as a lead screw or a rack gear extending in the forward and rearward directions along the fixed rail 41, and the drive motor 43 may be provided with a lead nut or a pinion gear 46 screwed to the guide rod 45. Accordingly, during the movement of the drive motor 43, the guide rod 45 is rotated, and the lead nut or the pinion gear 46 are moved along the guide rod 45. Accordingly, the seat frame S may be moved together with the drive motor 43 and the moving rail 42.

The seat frame S may be moved in the forward and rearward directions by the seat track 40 described above. The seat track 40 may be provided in plural on the upper end portion of the moving bracket 20, but may be configured as a single track to reduce mounting space.

Meanwhile, as illustrated in FIG. 5 and FIG. 6, the base bracket 10 is in a pair of base panels 12, and the moving bracket 20 is in a pair of moving panels 22. Accordingly, the support rigidity of the base bracket 10 and the moving bracket 20 is secured.

Here, the moving bracket 20 is located between the pair of base panels 12, a sliding portion 11 is provided on an internal surface of each of the base panels 12, and a guide rail 21 connected to the sliding portion 11 is provided in a surface of each of the moving panels 22 opposite to the base panel 12, so that the moving bracket 20 may be moved in the base bracket 10.

That is, the guide rail 21 is in a channel structure extending in the upward and downward directions, and the sliding portion 11 is configured to be inserted into the guide rail 21. Accordingly, the guide rail 21 moves by sliding on the sliding portion 11, so that the guide rail 21 and the moving bracket 20 moves to lift and lower.

Furthermore, since the moving bracket 20 is located between the pair of base panels 12, the whole size of the seat apparatus is reduced, and the moving bracket 20 is protected from external interference. Accordingly, the lifting and lowering of the moving bracket 20 may be efficiently performed.

Here, a support rod 13 may be provided in the base bracket 10, the support rod being combined with each of the base panels 12 by extending in an opposite direction thereof. The support rod 13 is located to avoid the moving bracket 20 and the drive mechanism 30 provided between the pair of base panels 12, and allows rigidity of the base bracket 10 to increase by being combined with each of the base panels 12. The support rod 13 may be configured in plural in a surface of the base panel 12 and may be combined with the base panel 12 by extending in a direction perpendicular to the base panel 12.

Furthermore, a connecting rod 23 may be provided in the moving bracket 20, the connecting rod being combined with each of the moving panels 22 by extending in an opposite direction thereof.

Accordingly, the pair of moving panels 22 is integrally connected to each other by the connecting rod 23, so that the rigidity of the moving bracket 20 increases. The connecting rod 23 may be configured in plural in a surface of the moving panel 22 and may be combined with the moving panel 22 by extending in a direction perpendicular to the moving panel 22.

The support rod 13 and the connecting rod 23 may be formed in a rod shape, and may be bolted to the base panel 12 and the moving panel 22, respectively, to be combined therewith.

Meanwhile, as illustrated in FIG. 5 and FIG. 6, the base bracket 10 may be configured as a shape of a polygon by a fixing portion 10*a* fixed to the body floor F and a plurality of extension portions 10*b* extending upwards from the fixing portion 10*a*, and the moving bracket 20 may be configured as a shape of a polygon by a mount portion 20*a* to which the seat track 40 is mounted and a plurality of connection portions 20*b* extending downwardly from the mount portion 20*a*.

Here, the base bracket 10 may be formed in a trapezoidal shape, and the fixing portion 10*a*, which forms a lower end portion of the base bracket, is configured to be longer than an upper end portion of the base bracket. Accordingly, the base bracket 10 obtains a fixing force to the body floor F. Furthermore, since the base bracket 10 has the trapezoidal shape, the base bracket secures its own rigidity to support the weight of a driver and the length of the upper end portion is reduced so that the weight of the seat apparatus is reduced.

Meanwhile, the moving bracket 20 may be configured in a trapezoidal shape or a triangle shape, and the mount portion 20*a* is formed to extend in the forward and rearward directions such that the seat track 40 is securely fixed thereto. In the drawings, the moving bracket 20 is formed in a triangular shape, and as the moving bracket 20 has the triangular shape, the rigidity of the moving bracket 20 is secured and the weight thereof is reduced.

Any one extension portion 10*b* of the base bracket 10 and any one connection portion 20*b* of the moving bracket 20 may be collinear with each other, and the guide portion G may be provided in the extension portion 10*b* which is collinear with the connection portion 20*b*. Accordingly, any one of each of the extension portion 10*b* of the base bracket 10 and the connection portion 20*b* of the moving bracket 20 is collinear with each other, so that the moving bracket 20 may be moved in the base bracket 10 via the guide portion G. Furthermore, without a separate rail structure for mounting the guide portion G to the base bracket 10, the extension portion 10*b* alone supports the weight of the seat apparatus and allows the guide portion G to be disposed.

Meanwhile, as illustrated in FIG. 3, the drive mechanism 30 includes: a motor portion 31 mounted to the base bracket 10; and a conveying portion 32 extending in an extending direction of the guide portion G from the motor portion 31 and connected to the moving bracket 20, the conveying portion allowing the moving bracket 20 to move along the guide portion G during operation of the motor portion 31.

Here, the motor portion 31 is mounted to the base bracket 10, and the conveying portion 32 extending from the motor portion 31 is connected to the moving bracket 20. Accordingly, during the operation of the motor portion 31, the moving bracket 2 may be moved in the base bracket 10 by the conveying portion 32.

The motor portion 31 is configured to provide a rotational force, and the conveying portion 32 is configured as the lead screw extending along the extending direction of the guide portion G, and a moving portion 24 may be provided in the moving bracket 20, the moving portion being screwed to the lead screw and moving along the conveying portion 32 rotated during the operation of the motor portion 31.

Here, the motor portion 31 may be driven by a user's switch manipulation and during the operation of the motor portion 31 when the drive signal of the switch is input, the moving portion 24 connected to the conveying portion 32 configured as the lead screw is moved by the rotation of the conveying portion 32, so that the moving bracket 20 is moved together with the moving portion 24. Accordingly, the moving portion 24 may be configured as a lead nut to be screwed to the lead screw, and the conveying portion 32 may be configured to extend in the same direction as the extending direction of the guide portion G, so that the moving portion 24 can move along the guide portion G.

The drive mechanism 30 described above may apply a rack and pinion structure or a hydraulic actuator structure in addition to the screw connection structure of the lead screw to allow the moving bracket 20 to be moved. Various embodiments of such a drive mechanism may be applied according to design thereof.

Meanwhile, the apparatus of the present invention may further include: an auxiliary drive portion 50 rotatably connected to the body floor F at a first end portion thereof and rotatably connected to the moving bracket 20 at a second end portion thereof, the auxiliary drive portion being variable in length to assist the lifting and lowering of the moving bracket 20.

The auxiliary drive portion 50 is elastically variable in length, and may be configured as a coil spring or a gas lift. Accordingly, the length of the auxiliary drive portion 50 changes in the lifting/lowering directions of the moving bracket 20 during the lifting/lowering of the moving bracket 20. Accordingly, the auxiliary drive portion 50 supplies an assistance force to the moving bracket 20 in the moving direction thereof.

That is, the auxiliary drive portion 50 is configured to be variable in length in the extending direction of the guide portion G and to provide a repulsive force to the moving bracket 20 in a lifting direction thereof. Accordingly, the auxiliary drive portion 50 is provided to be changed in length in the extending direction of the guide portion G, and provides a repulsive force in the lifting direction of the moving bracket 20. Accordingly, a force is added to the moving bracket 20 lifted by the drive mechanism 30 such that the seat frame S lifts smoothly. The number of the auxiliary drive portion 50 to be mounted and an elastic force thereof may be set according to the performance of the drive mechanism 30.

As described above, in an exemplary embodiment of the present invention, as the base bracket 10 requiring a small mounting range is provided in a lower space in which the seat is disposed, interference with the lower space is minimized, so that the space efficiency is improved. Accordingly, it is easy to install a control unit and a cable for driving the seat, and other devices may be disposed in the secured space.

Accordingly, the seat apparatus of the present invention allows space to be secured below the seat to improve the indoor atmosphere due to the improved space efficiency, and may be applied to various transportation means as well as vehicles.

Although the exemplary embodiment of the present invention has been described for illustrative purposes, those skilled in the art will appreciate that various modifications, additions and substitutions are possible, without departing from the scope and spirit of the present invention as included in the accompanying claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A seat apparatus for a vehicle, wherein the seat apparatus is mounted to a body floor, the apparatus comprising:
   a base bracket fixed to the body floor;
   a moving bracket coupled to the base bracket to lift and lower in upward and downward directions via a guide portion extending in the upward and downward directions from the base bracket;
   a drive mechanism mounted to the base bracket and connected to the moving bracket, the drive mechanism providing power so that the moving bracket selectively moves along the guide portion;
   a seat track mounted to the moving bracket and configured for lifting and lowering with the moving bracket, the seat track allowing a seat frame to move in forward and rearward directions thereof; and
   an auxiliary drive portion rotatably connected to the body floor at a first end portion of the auxiliary drive portion and rotatably connected to the moving bracket at a second end portion of the auxiliary drive portion,
   wherein the auxiliary drive portion is configured to be variable in length of the auxiliary drive portion to assist the lifting and lowering of the moving bracket.

2. The apparatus of claim 1, wherein the guide portion is mounted to the base bracket by diagonally extending in the forward or rearward direction therefrom or vertically extending therefrom.

3. The apparatus of claim 1, wherein the guide portion includes a guide rail extending in the upward and downward directions and a sliding portion coupled to the guide rail to slide thereon.

4. The apparatus of claim 3,
   wherein the guide rail is in pair to form a pair of guide rails,
   wherein the sliding portion is in pair to form a pair of sliding portions,
   wherein the base bracket includes a pair of base panels, with the pair of sliding portions being mounted on an internal surface of each of the base panels, and
   wherein the moving bracket is located between the pair of base panels and has the pair of guide rails mounted at each of a first opposite side and a second opposite side of the moving bracket, the pair of guide rails being connected to the pair of sliding portions.

5. The apparatus of claim 4,
   wherein at least a support rod is mounted in the base bracket, and
   wherein the at least a support rod is connected with each of the base panels.

6. The apparatus of claim 4, wherein the moving bracket includes a pair of moving panels, with the pair of guide rails being mounted on a surface of each of the pair of moving panels opposite to the base panels.

7. The apparatus of claim 6, wherein at least a connecting rod is mounted in the moving bracket, the at least a connecting rod being connected with each of the pair of moving panels.

8. The apparatus of claim 1,
wherein the base bracket includes a fixing portion fixed to the body floor and a plurality of extension portions extending upwards from the fixing portion, and
wherein the moving bracket includes a mount portion to which the seat track is mounted and a plurality of connection portions extending downwardly from the mount portion.

9. The apparatus of claim 8, wherein one of the plurality of extension portions of the base bracket and one of the plurality of connection portions of the moving bracket are collinear with each other, and the guide portion is mounted in the one of the plurality of extension portions which is collinear with the one of the plurality of connection portions.

10. The apparatus of claim 1, wherein the drive mechanism includes:
a motor portion mounted to the base bracket; and
a conveying portion extending in an extending direction of the guide portion from the motor portion and connected to the moving bracket, the conveying portion allowing the moving bracket to move along the guide portion during an operation of the motor portion.

11. The apparatus of claim 10,
wherein the motor portion is configured to provide a rotational force,
wherein the conveying portion includes a lead screw extending along an extending direction of a guide rail, and
wherein a moving portion is mounted in the moving bracket, the moving portion being screwed to the lead screw and being moved along the conveying portion rotated during an operation of the motor portion.

12. The apparatus of claim 1, wherein the auxiliary drive portion is configured to be variable in length in an extending direction of the guide portion and to provide a repulsive force to the moving bracket in a lifting direction thereof.

13. The apparatus of claim 12, wherein the auxiliary drive portion is elastically variable in length.

14. The apparatus of claim 1, wherein the seat track includes:
a fixed rail fixed to an upper end portion of the moving bracket and extending in the forward and rearward directions;
a moving rail connected to the fixed rail to slide in the forward and rearward directions thereon and to which the seat frame is mounted; and
a drive motor mounted to the moving rail and moving the moving rail in the forward and rearward directions.

15. The apparatus of claim 14, wherein the seat track further includes:
a guide rod to which the moving rail is mounted,
wherein the drive motor is engaged with the guide rod to rotate the guide rod.

* * * * *